United States Patent [19]

Fazel et al.

[11] Patent Number: 5,218,622
[45] Date of Patent: Jun. 8, 1993

[54] SYSTEM OF ENCODING DIGITAL SIGNALS INTENDED FOR TRANSMISSION AND/OR STORAGE AND A CORRESPONDING DECODING SYSTEM

[75] Inventors: Khaled Fazel, Vincennes; Jean-Jacques Lhuillier, Saint-Maur, both of France

[73] Assignee: U.S. Philips Corporation, New York, N.Y.

[21] Appl. No.: 630,700

[22] Filed: Dec. 20, 1990

[30] Foreign Application Priority Data

Dec. 29, 1989 [FR] France ............................. 89 17452
Feb. 16, 1990 [FR] France ............................. 90 01891
Mar. 16, 1990 [FR] France ............................. 90 03406

[51] Int. Cl.⁵ ............................................. H04N 11/02
[52] U.S. Cl. ..................................... 375/122; 358/138; 371/37.1
[58] Field of Search ............... 375/25, 31, 34, 122; 358/133, 138, 426, 427, 430; 341/65, 67; 371/37.1, 41

[56]  References Cited
U.S. PATENT DOCUMENTS 4,633,483 12/1986 Takahashi et al. ............ 375/122
4,782,387 11/1988 Sabri et al. ...................... 358/138
4,939,583  7/1990 Tsuboi et al. ................... 358/427
4,982,282  1/1991 Saito et al. ..................... 375/122

Primary Examiner—Benedict V. Safourek
Attorney, Agent, or Firm—Michael E. Marion

[57] ABSTRACT

A system of encoding digital signals comprising a source encoder followed by a transmission channel encoder, which is characterized in that in the case in which the source encoder is a variable-length encoding circuit (10), the channel encoder comprises a series arrangement of a sub-assembly of encoding with selective protection and a sub-assembly of encoding without selective protection. The signals being arranged in information component blocks. The system includes a stage for encoding lengths of blocks for determining along the block an accumulated length of code words supplied by said source encoder and ensuring the encoding of block lengths thus determined, a stage for selective protection of said blocks and a stage for multiplexing the signals supplied by said length encoding and selective protection stages. The corresponding decoding system comprises a transmission channel decoder followed by a source decoder, the channel decoder comprising a series arrangement of a sub-assembly for decoding with non-selective protection and a sub-assembly for decoding with n levels of selective protection.

12 Claims, 4 Drawing Sheets

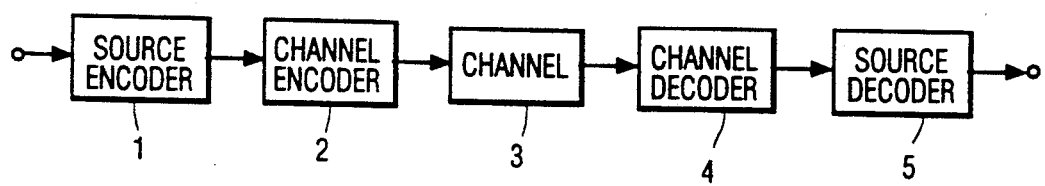
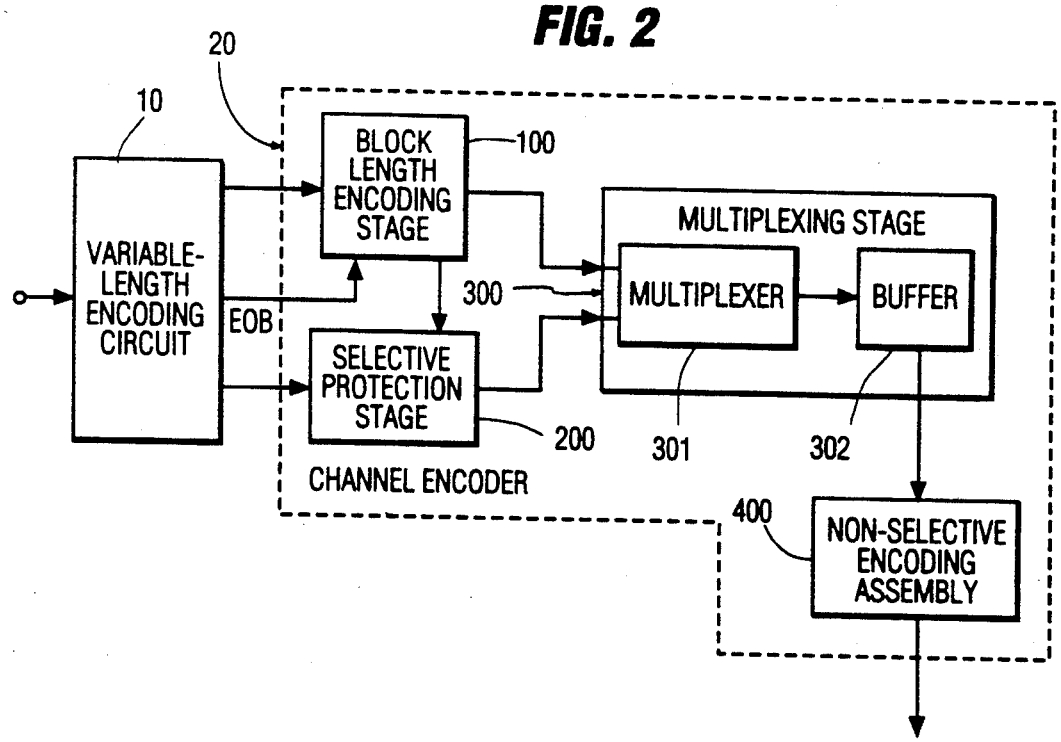

SYSTEM OF ENCODING DIGITAL SIGNALS INTENDED FOR TRANSMISSION AND/OR STORAGE AND A CORRESPONDING DECODING SYSTEM

BACKGROUND OF THE INVENTION

The present invention relates to a system of encoding digital signals comprising a source encoder followed by a transmission channel encoder. It also relates to a system of decoding digital signals which were previously submitted to a variable-length coding, an encoding with selective protection and an encoding without selective protection, the said system comprising a transmission channel decoder followed by a source decoder.

Digitizing television signals requires the possibility of transmitting a very large quantity of binary information components with a rate of the order of 220 Mbit/s. Such a rate cannot be ensured at reasonable cost by contemporary transmission channels, and different information encoding techniques have been proposed with the object of reducing the quantity of information components and consequently the rate. Such an objective is actually achieved by reducing the redundancy of information components, but, then, each information component transmitted becomes essential. Any possible transmission errors which might rather easily be corrected when the information components to be transmitted are redundant, have increasingly more serious consequences when this redundancy is reduced. Actually, the extent of faults due to transmission errors unfortunately increases more rapidly than the rate reduction factor.

When a transmission channel beset with noise is present, efforts have been made to find protection from these transmission errors or to reduce their effects. One of the techniques thus proposed consists, for the encoding of information components, in associating an error correction coding (alternatively denoted channel coding) to a rate reducing coding (alternatively denoted source encoding) which renders it possible to protect in a selective manner the information components which are most sensitive to transmission errors. A method and a coding system ensuring such a protection are described, for example, in the U.S. Pat. No. 4,555,729.

The recent use, in source encoders, of variable-length codes which still further improve the performances of these encoders, leads to a new reduction of the redundancy of the information components. Consequently, said information components are even more vulnerable to transmission errors. On the other hand, a variable-length encoding results in allocating to information component blocks of similar dimensions, a variable number of bits as a function of the information contained in each block. In this case, the presence of transmission errors may cause the loss of the proper segmentation of encoding words corresponding to a block, or the loss of synchronization between blocks, which would entail the appearance of false designs as well as spatial shifts in the picture.

These faults are difficult to correct with contemporary error correction techniques, to that extent that, with a variable-length encoding, the positions of important information components in the binary sequence are not known. An error in the most significant bits of the direct current component, for example, is much more perceptable than an error in the last bits of a block of information components. But, by reason of the variable length of the coding sequences (or words), the contemporary techniques have proved to be incapable of correcting this type of error in an adapted manner.

SUMMARY OF THE INVENTION

It is an object of the invention to propose a digital signal encoding system which, while still being of a relatively simple structure, obviates the drawbacks mentioned in the foregoing when one wants to protect in a selective manner information components which have previously been submitted to a variable-length encoding. To this effect, the invention relates to a coding system characterized in that, for the case in which the source encoder is a variable-length coding circuit, the channel encoder comprises a series arrangement of a sub-assembly of encoding with selective protection and a sub-assembly of encoding without selective protection.

The structure thus proposed provides an efficient solution for the problems mentioned. Actually, for a desirable average redundancy which will, for example, be of the order of 10% for the channel encoder, simulations have shown that an encoder with selective protection combined with a source encoder would require a considerably complex hardware. By adopting the proposed structure, that is to say by cascading two simple coding operations, one of which ensures a non-selective coarse protection and the other a selective protection at several levels, a compromise is realized performance and complexness, all this for a relatively small additional redundancy. The selective encoding has for its object to reduce the error rate in the bits of the signal blocks resulting from the variable-length coding, as a function of the importance of these bits, while the non-selective encoding is intended to reduce the error rate of the channel to a moderate value, the two encoding operations thus associated sharing together the redundancy assigned to the channel encoder.

In a preferred embodiment, the said system is more specifically characterized in that, the signals being arranged in information component blocks, the sub-assembly of encoding with selective protection comprises:

A) a stage for encoding lengths of blocks determining along a block an accumulated length of code words supplied by said source encoder and ensuring the encoding of block lengths thus determined;

B) a stage for selective protection of said blocks;

(C) a stage for multiplexing the signals supplied by said length encoding and selective protection stages.

As a matter of fact, since the use of a variable-length encoding provides signal blocks whose dimension—that is to say the number of bits per block—varies as a function of the information contained in the original block, it is of importance to operate an adjustment, or synchronization, of these variable-size blocks so as to enable a distinction between information components belonging to each of these blocks. The solution, which here consists of transmitting the length of the block, enables, thereafter, an easy marking of the beginning of each block.

In a specific embodiment of the stage for encoding these lengths, this stage comprises:

(A) means for determining the length of each block after the variable-length encoding, the means comprising:

(a) a bit counting circuit arranged for counting for each block the number of bits of the variable-length encoded signals supplied by the source encoder in association with each block;

(b) a memory for storing the output signal of said bit counting circuit;

(B) means for counting the number of blocks whose length has been determined, which means comprise:

(c) a circuit for counting blocks starting from signals indicating the end of a block and being also supplied by said source encoder;

(d) a decision circuit for controlling reading of the memory as a function of the output signal of said block counting circuit;

(C) length-encoding means, comprising:

(e) an encoding circuit for supplying the words for encoding the length of said blocks.

The synchronizing information components which are the said block lengths are very important and advantageous, and their protection from errors is ensured in an efficient manner when the encoding circuit of the length encoding means is a simple and powerful encoder, for example a linear systematic binary encoder. Satisfactory results are obtained with an encoder denoted C(52, 40), for code words having a maximum of 40 bits and 12 parity bits.

In a specific embodiment of the selective block protection stage, the stage comprises:

(A) means for classifying the bits in accordance with their sensitivity to transmission errors;

(B) means for selective encoding as a function of said classification;

(C) means for reducing the code words resulting from said selective encoding. For the selective encoding means, a what is commonly denoted a Blokh-Zyablov encoder is preferably chosen, which in a simple manner allows, by reduction, of the adaptation of the length of the words to be encoded to the length of the blocks to be encoded. As the reducing procedure generally significantly reduces the efficiency of the code with respect to the non-reduced code, the choice of the Blokh-Zyablov code is instigated by the desire to ensure several protection levels, while still providing an optimum efficiency after reduction.

In accordance with a particular embodiment of the said means, the coding system is such that:

(A) the means for classifying the bits in accordance with their sensitivity to transmission errors comprise (a) a memory for receiving in a first memory zone the variable-length encoded signals from the source encoder and in a second memory zone the order of the said encoded signals for addressing said first memory zone and for supplying said encoded signals in a sequence which is modified as a function of said addressing;

(B) the means for selective encoding as a function of said classification comprise:

(b) a Blokh-Zyablov encoder;

(C) the means for reducing the selective encoding word comprise bit suppressing means.

Moreover, since the lengths of the blocks can vary significantly, the encoding system is characterized in that the multiplexing stage comprises:

(A) means for multiplexing the output signals of the said block-length encoding stage and said stage for selective protection of the blocks;

(B) means for controlling the rate of the output signals from said multiplexing means;

and in that, when the length L of the block considered exceeds the coding capacity K of the said selective protection stage, said multiplexing means also provides for the multiplexing of the non-coded (L-K) bits.

Whatever the specific characteristics of these various embodiments, it is necessary to ensure also the decoding of digital signals which have previously been submitted to a processing operation as defined in the foregoing, namely a variable-length encoding followed by encoding operations with and without selective protection.

A further object of the invention is therefore to provide a decoding system suitable for processing encoded digital signals such as the signals supplied by the encoding system defined in the foregoing.

To this effect, the invention also relates to a system which is characterized in that the channel decoder comprises, arranged in series, a decoding sub-assembly with non-selective protection and a decoding sub-assembly having n selective protection levels.

In a preferred embodiment, this decoding system is characterized in that, the signals having been encoded in blocks, said n-selective protection level decoding sub-assembly comprises:

(A) a length decoding stage, arranged for permitting during each decoding operation the decoding of those received signals which correspond to the lengths of said blocks;

(B) a stage for decoding other received encoded signals;

(C) a demultiplexing stage particularly provided for switching the received encoded digital signals either to said length decoding stage or to said stage for decoding the other encoded signals.

This stage for decoding other received encoded signals preferably comprises:

(A) means for demultiplexing said other encoded signals, and also any non-encoded (L-K) signals from said encoding with selective protection, when the length L of a block exceeds the encoding capacity K;

(B) selective decoding means comprising a Blokh-Zyablov decoder having n parallel-arranged selective decoding circuits, (C) inverse reducing means, for adapting the format of the signals to be decoded to the capacity of the said selective decoding means when the length L of a block is less than said encoding capacity K;

(D) means for classifying the decoded signals in accordance with their sensitivity to transmission errors;

(E) storage means for storing the signals thus classified.

More particularly, in the example described, the Blokh-Zyablov decoder comprises:

(a) a matrix memory for storing the output signals of said filling circuit;

(b) a circuit for calculating the matrix expression $R_i = R - C(k_1, k_2, \ldots k_{i-1}, 0, \ldots 0)$ wherein R is the content of said matrix memory and $C(k_1, k_2, \ldots, k_{i-1}, 0, \ldots 0)$ is the code word obtained when all the $k_i$ which have not yet decoded are considered to be equal to zero;

(c) a circuit for matrix multiplication in view of determining the matrix expression $M_i = (G^t)^{-1} \cdot R_i$ where $(G^t)^{-1}$ is the inverse of the transposed matrix of the following matrix G:

$$G = \begin{bmatrix} 1 & 0 & 0 & 0 \\ 1 & 1 & 0 & 0 \\ 1 & 0 & 1 & 0 \\ 1 & 0 & 0 & 1 \end{bmatrix}$$

(d) a decoding device, comprising a demultiplexing circuit, subsequently, arranged in parallel, n selective decoding circuits followed by a series arrangement of a matrix memory for storing the decoded output signals of said decoding circuits and a code word recovery circuit for recovering the code words intended for updating the expression $C(k_1, k_2, \ldots, k_{i-1}, 0, \ldots, 0)$ applied to said circuit for calculating the matrix expression $R_i$;

(e) a transmission error detection circuit, in view of correcting the decoding effected by said decoding device, the said transmission error detection circuit being advantageously of such a structure that it comprises, to realize the (n−1) cycles of detecting errors, means for comparing the columns of the matrix expression $R_i$ on the one hand and, for the (n−1) levels of selective protection other than the first level, the assemblies $E_2, E_3, \ldots, E_n$ of the words on the other hand, which words are formed by combining the (n−1) last lines of the matrix G, by combining the (n−2) last lines of G, etc. . . ., and by combining the last two lines of G, and which are formed from the last line of G for the nth protection level respectively.

BRIEF DESCRIPTION OF THE DRAWINGS

Particulars and advantages of the invention will now become more apparent from the following description which is given by way of example with reference to the accompanying drawings, in which:

FIG. 1 is a basic circuit diagram showing, in a digital signal transmission circuit, the source encoder/channel encoder combination and the channel decoder/source decoder combination;

FIG. 2 shows an embodiment of circuits of an encoding system in accordance with the invention;

DETAILED DESCRIPTION OF THE INVENTION

Figure 3:
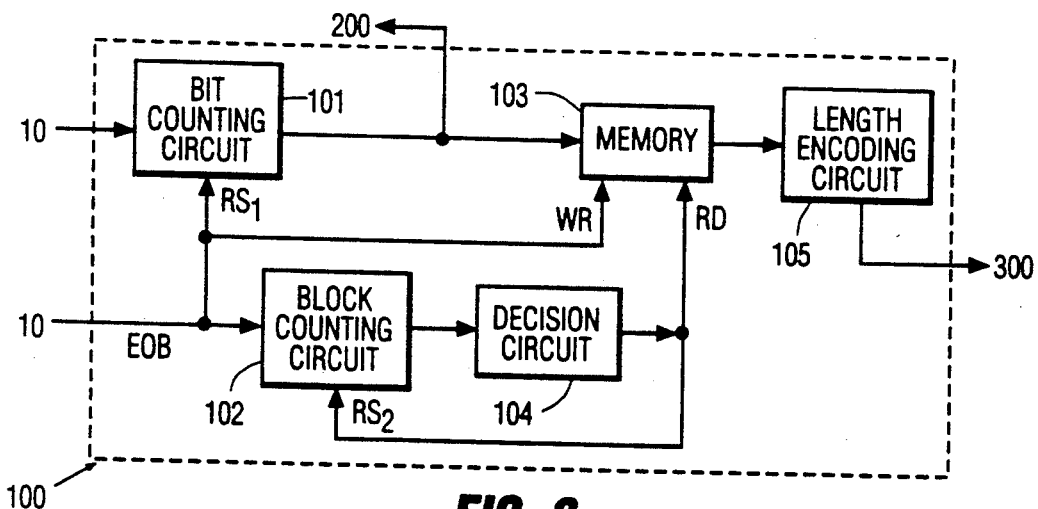
FIGS. 3 and 4 show, respectively, an embodiment of the length-encoding stage and the selective protection stage of the encoding system of FIG. 2.

As has been described in the foregoing, a known technique of protection against transmission errors consists in associating a channel encoder with a source encoder. This technique is shown schematically in FIG. 1, which comprises a source encoder 1 and, arranged between this encoder and a transmission channel 3, a channel encoder 2. In a symmetrical manner, a channel decoder 4 followed by a source decoder 5 are present at the output of the channel 3. In the present description, the description will first be given with reference to the encoding section, by describing with the aid of FIGS. 2 to 5 an example of the encoding system in accordance with the invention, and thereafter everything referring to the decoding section situated downstream of the channel, that is to say the assembly formed by the channel decoder and the source decoder, with reference to FIGS. 6 to 9.

The encoding system shown in FIG. 2 comprises a variable-length encoding circuit 10. This circuit 10 constitutes the source encoder and basically comprises, in a conventional manner, an orthogonal transformation and quantization circuit, a variable-length encoding circuit, and a rate regulating circuit including a buffer memory. The encoding system further includes a channel encoder 20, which comprises a series arrangement of an encoding sub-assembly with selective protection and an encoding sub-assembly without selective protection.

The encoding sub-assembly with selective protection includes, more specifically, a stage 100 for encoding the accumulated lengths of the code words of a block (the term block lengths will be used to make the description more exact) supplied by the encoding circuit 10, a stage 200 for the selective protection of information component blocks supplied by the encoding circuit 10, and a multiplexing stage 300 for the signals supplied by the said length and selective protection encoding stages 100 and 200.

Information component blocks must be understood to mean signal sub-assemblies of the same dimensions, which are obtained by subdividing the initially considered information bit clusters (for example television pictures). These information bit blocks, after having been submitted to said orthogonal transformation, can be classified, by comparing them to thresholds, in accordance with a greater or lesser activity (connected with contours, contrasts, greater or less great uniformity of the blocks), and a signal expressing this classification is then transferred by the orthogonal transformation and quantizing circuit, and transmitted. Similarly, the rate regulating circuit includes a feedback loop through which a standardization signal is conveyed which is also transmitted. These classification and standardization signals are useful, at the receiving end, to effect operations which are the inverse of those used at the transmission end, with a view to the recovery of the blocks and the recovery of information clusters which are similar to the initial information clusters.

The block length encoding stage 100 shown in FIG. 3 comprises means (101, 103) for determining the length of each block after variable-length encoding, means (102, 104) for counting the number of blocks of which the length has been determined, and length encoding means. Put more precisely, this stage 100 first of all includes a circuit 101 for counting the bits corresponding to a block and a block counting circuit 102. An end-of-block signal EOB is applied by the orthogonal transformation and quantizing circuit of the circuit 10 to the block counting circuit 102, the content of which is incremented by one unit each time the signal EOB is received. The block length determined by the circuit 101 is stored in a memory 103, and the counting circuit 101, reset to zero under the control of the signal EOB (line $RS_1$), is available for a new block length count. Writing into the memory 103 (line WR) is controlled by the signal EOB.

A decision circuit 104 determines, by comparison to a pre-registered number, on the basis of what number of blocks—and consequently lengths determined—the memory 103 must be read. This circuit 104, which is a comparator, is placed at the output of the block counting circuit 102 and supplies (line RD) a read control signal for the memory 103 at the instant at which the content of the circuit 102 (the number of blocks of which the lengths have been determined) is equal to the pre-registered number. This read control signal is also conveyed to the circuit 102 to reset it to zero (line $RS_2$). The pre-registered number is, for example, equal to 4, and reading of the memory 103 occurs when four lengths have been determined and stored sequentially.

These four block lengths, which represent a maximum of 40 information bits when the bit counting circuit 102 is a 10-bit counter, are sequentially applied to a length encoding circuit 105. This circuit 105 is a systematic linear binary encoder, denoted encoder "in blocks", which has been chosen for its suitability to correct y errors for x information components received: the number x of bits received applied by the memory 103 to the encoding circuit 105 being, as has been mentioned in the foregoing, equal to 40 at the utmost, the maximum number of errors one wants to correct for such a number of information components received is equal to 2, and the binary code then chosen is denoted C(52, 40), 40 representing the maximum number of bits received and the remaining 12 bits being parity bits. The output of the encoding circuit 105 constitutes the output of the block length encoding stage 100.

Figure 4:
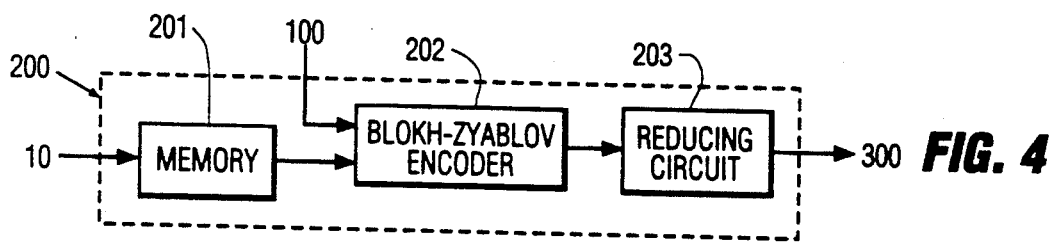

The stage 200 for the selective protection of information component blocks, shown in FIG. 4, first of all includes a memory 201, which constitutes a circuit for classifying the bits in accordance with the sensitivity of these bits to errors caused by the transmission channel. For code words resulting from a variable-length encoding, this sensitivity is determined on the basis of previous statistic analyses, the results of which are grouped in a Table associated with memory 201. The bits supplied by the variable-length encoding circuit 10 are stored in the memory 201 and thereafter read again in accordance with a sequence of addresses contained in the Table, with a view of arranging these bits in a certain order (generally in an order of decreasing sensitivity), which are then applied to a selective encoding circuit as a function of the said classification, for example a Blokh-Zyablov encoder 202, which has been selected for its suitability to permit a plurality of encoding levels in accordance with the bit classification effected.

In all cases, this encoder 202 is capable of encoding K bits at a maximum. If the length L of an information component block is less than this encoding capacity K, the (K-L) non-used bits cause a reset to zero in the information component circuit of length K processed by the Blokh-Zyablov encoder 202. If in contrast thereto the length L exceeds the capacity K, only K bits are encoded. The (L-K) remaining bits are not encoded and are multiplexed with the code words produced by the Blokh-Zyablov encoder, in the multiplexing stage 300.

In the present case one has opted for having, for example, four coding levels, that is to say a four-level selective protection. The encoder 202, shown in FIG. 5, then includes, first of all, a demultiplexing circuit 210, thereafter, arranged in parallel, four selective encoding circuits 211 to 214, each receiving the bits assigned to them by the circuit 202. In the example described, the encoder 210 has a coding capacity of 489 bits, and said selective encoding circuits respectively receive not more than the following signals, corresponding to each protection level:

circuit 211: 113 bits (protection level i), representing the most significant bits in each block;
circuit 212: 125 bits (level 2);
circuit 213: 125 bits (level 3);
circuit 214: 126 bits (level 4) representing the least significant bits in each block. If the length of a block exceeds 489 bits, the additional bits are not encoded nor protected.

At the output of these four encoding circuits 211 to 214 there are thereafter provided a matrix memory 215 for storing the encoded output signals of these circuits, thereafter a matrix multiplication circuit 216 for multiplying the content of the memory 215 by the transposed matrix $G^t$ of the following matrix G:

$$G = \begin{bmatrix} 1 & 0 & 0 & 0 \\ 1 & 1 & 0 & 0 \\ 1 & 0 & 1 & 0 \\ 1 & 0 & 0 & 1 \end{bmatrix}$$

The matrix memory 215 comprises 4 lines, equal to the number of selective protection levels, and 127 columns. This format is the same as that of the matrix, denoted C, of the result of said matrix multiplication.

The signals EOB indicating the end of the block already mentioned, provide the write command and thereafter the read command of the memory 215. Delay circuits 217 and 218 are arranged in the write and read command links, denoted WR and RD, respectively, of the memory 215 to take into account the duration of the selective encoding operations and for synchronizing these two commands relative to the signals to be stored and thereafter read.

The output signal of the circuit 216, which constitutes the output signal of the encoder 202, is applied to a reducing circuit 203, which renders it possible to suppress, if necessary, that is to say when they exist, the (K-L) bits which have been reset to zero, and the output signal of this circuit 203, which constitutes the output signal of the stage 200, is then conveyed to the multiplexing stage 300.

The mode of operation of the encoder 202 is as follows. Let $k_i$ be the number of bits for each encoding level, wherein i=1 to 4, when four encoding levels are used. The numbers $k_1$, $k_2$, $k_3$, $k_4$ being associated with each one of the respective four levels, there is added to each of the $k_i$ bits a number m corresponding to the parity bits connected with the extent of protection wanted for each level. In the example described, the following options have been made: $m_1=14$, $m_2=2$, $m_3=2$, $m_4=1$, where the choice of the couples ($m_i$, $k_i$) must permit the classification of the code words thus constituted in the memory 215, arranged as follows, wherein M denotes the matrix corresponding to the content of this memory:

$$M = \begin{bmatrix} (\ldots\ldots m_1 \ldots) & (\ldots\ldots\ldots\ldots k_1 \ldots\ldots\ldots) \\ (\ldots\ldots m_2 \ldots) & (\ldots\ldots\ldots\ldots k_2 \ldots\ldots\ldots) \\ (\ldots\ldots m_3 \ldots) & (\ldots\ldots\ldots\ldots k_3 \ldots\ldots\ldots) \\ (\ldots\ldots m_4 \ldots) & (\ldots\ldots\ldots\ldots k_4 \ldots\ldots\ldots) \end{bmatrix}$$

For the encoder described here, which has four protection levels, the code words are obtained by multiplying the transpose $G^t$ of the matrix G by this matrix M:

$$G_t = \begin{bmatrix} 1 & 1 & 1 & 1 \\ 0 & 1 & 0 & 0 \\ 0 & 0 & 1 & 0 \\ 0 & 0 & 0 & 1 \end{bmatrix}$$

which results in:

$$C = G^tM = \begin{bmatrix} (\ldots\ldots\ldots\ldots\ldots\text{line 1}\ldots\ldots\ldots) \\ (\ldots\ldots m_2 \ldots)(\ldots\ldots\ldots k_2 \ldots) \\ (\ldots\ldots m_3 \ldots)(\ldots\ldots\ldots k_3 \ldots) \\ (\ldots\ldots m_4 \ldots)(\ldots\ldots\ldots k_4 \ldots) \end{bmatrix}$$

As will be obvious, because of the structure of the matrix G which only differs from the unit matrix by the content of its first column, the code word produced for each block (formed by the sequence $C_1$ to $C_4$ of the four lines of the above matrix C) is quasi-systematic since the matrix multiplication effected has resulted, for the line 1 which is not shown in detail for reasons of simplicity, has a linear combination of bits masking a portion of the initial bits and consequently realizing a loss of these information bits. However, a portion of the information component bits are nevertheless found back again in the subsequent lines, which reduces the ultimate reducing procedure in the reducing circuit 203. For the case in which the block lengths are less than or equal to the encoding capacity K, all the bits received by the encoder 202 are encoded. When in contrast thereto these lengths exceed K, the stage 300 ensures, as has been described in the foregoing, not only multiplexing of the signals supplied by the length encoding and selective protection stages, but also multiplexing of the excessive (L-K) bits which the encoder 202 was not capable of encoding. The multiplexing operation is effected, in either case, by a multiplexer 301, and the latter is followed by a buffer memory 302 which is provided to ensure the regulation of the rate of the output signals of the encoding sub-assembly with selective protection. When the variable-length encoding circuit 10 includes a rate regulation circuit it is of course possible to combine these rate regulation means and said rate regulation circuit of the circuit 10 in one single rate regulation sub-assembly.

The subsequent encoding sub-assembly without selective protection, denoted 400, differs in general in that the transmission channel is either provided with a memory or not. When this channel has a memory, that is to say when the errors occur in packets, this encoding sub-assembly is preferably an encoder of the Reed-Solomon type, an interlacer operating with symbols then optionally being present in the transmission chain, to effect the adaptation of the length of the error packets to the number of bits constituting the symbols of the Reed-Solomon code. In the opposite case, in which the channel has no memory, the encoding sub-assembly without selective protection is rather an encoder of the binary BCH type, which is better suited to the correction of errors whose positions are absolutely random. These Reed-Solomon and BCH codes are described in, for example, the publication "Theory and practice of error control codes", R. Blahut, Addison-Wesley Publishing Company, May 1984.

Figure 6:
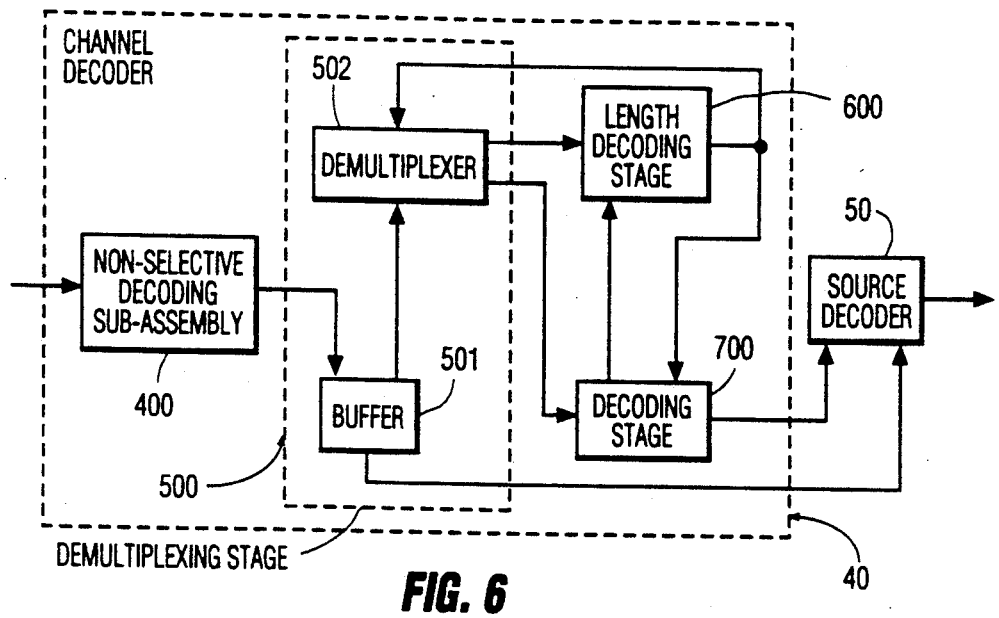
FIG. 6 shows an embodiment of circuits of an decoding system in accordance with the invention.

When thereafter a digital signal encoding operation has been effected in an encoding arrangement of the type as described in detail in the foregoing, the digital signals thus encoded, thereafter transmitted and/or stored, can conversely be decoded, in accordance with the invention, in a decoding system of the type shown, for example, in FIG. 6.

This decoding system of FIG. 6 comprises a transmission channel decoder 40 followed by a source decoder 50. The channel decoder 40 comprises, arranged in series, a decoding sub-assembly with non-selective protection, denoted 400, and a decoding sub-assembly with selective protection. The decoding sub-assembly with selective protection here comprises, more in particular, a demultiplexing stage 500 for switching the encoded digital signals received by the decoding system, a length decoding stage 600 for decoding that one of these encoded signals received that corresponds to the length determined in the stage 100 of the channel encoder 20, and a stage 700 for decoding the further encoded signals received. The decoding sub-assembly without selective protection receives the input signals of the system, that is to say signals whose multiplexing has been effected by the stage 300 of the channel encoder 20, namely: on the one hand the digital signals constituting, after encoding in the stage 100, the code words corresponding to the lengths of the variable portions of the blocks, and on the other hand the digital signals constituting the code words resulting from the selective protection of the blocks and coming from the stage 200. This decoding sub-assembly with selective protection comprises, as previously for the encoding operation, different circuits in accordance with the transmission channel type and may, for example, be a decoder of the Reed-Solomon type or a decoder of the binary BCH type.

The demultiplexing stage 500 includes means for modifying the rate of the signals received, here consisting of a buffer memory 501 which receives the output signal of the decoding sub-assembly with non-selective protection 400 and also signal separating means, here consisting of a demultiplexer 502 which switches the output signals of this memory either to the decoding stage 600, or to the decoding stage 700. These signals received by the stage 500 are signals which, after transmission and having passed through the sub-assembly 400, correspond to the encoded output signals of the length encoding stage 100 and to the encoded output signals of the selective protection stage 200, respectively.

Figure 7:
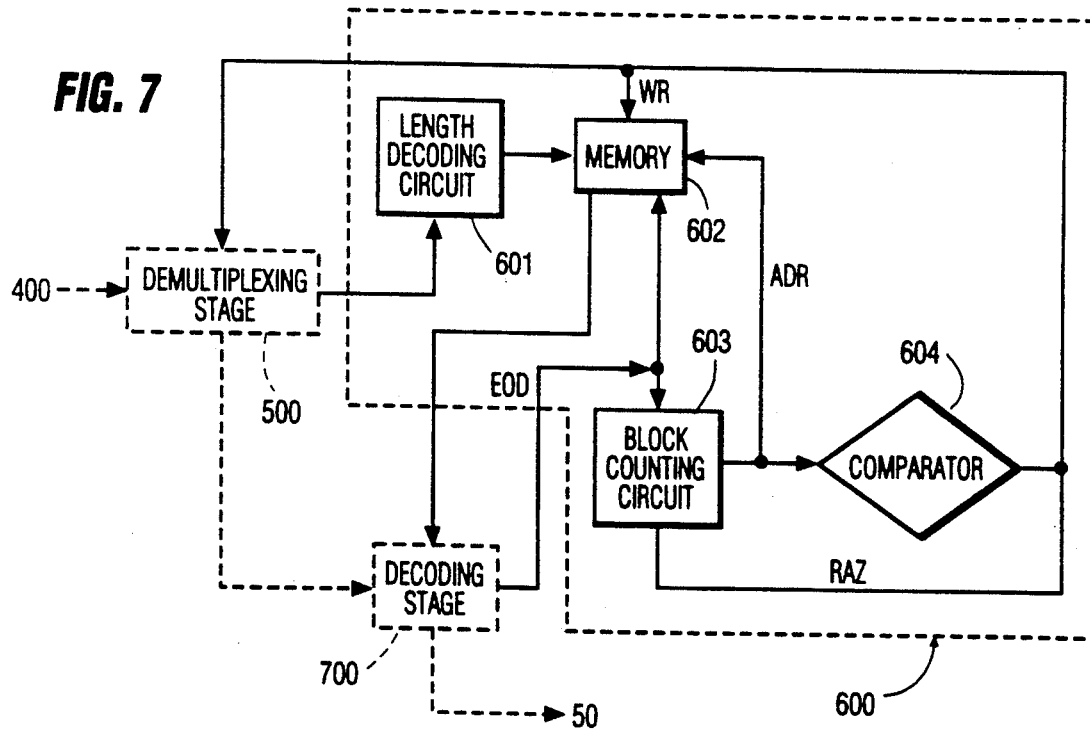
FIGS. 7 and 8 show, respectively, an embodiment of the length decoding stage and the other encoded signal decoding stage of the decoding system of FIG. 6.

The length decoding stage 600, shown in FIG. 7, comprises means for decoding encoded signals corresponding to the lengths and time rate means of the said decoding operation. Put more precisely, it here first of all includes, in the embodiment described, a length decoding circuit 60 which ensures the operations which are the opposite of the encoding circuit 105, that is to say, when applicable, the decoding of code words corresponding to the lengths of four blocks. The signals thus decoded are arranged in a memory 602, which is read at each end of the decoding operation of the decoding stage 700, under the control of an-end-of decoding signal EOD of the block supplied by the said stage 700. This signal EOD is also applied to a block counting circuit 603 which, after having decoded four block lengths, triggers the re-initialization of the procedure with a view to decoding of the subsequent four blocks.

A comparator 604 ensures that counting of the number of blocks is stopped, and the output signal of this comparator constitutes the re-initialization control signal conveyed to the demultiplexing stage 500, and also to the block counting circuit 603 to reset it to zero (RAZ), and to the memory 602 as the write command (WR).

The output signal of the memory 602 read at the address ADR supplied by the circuit 603, which also constitutes the output signal of the decoding stage 600 and is equal to the length of each block, is applied to the stage 700 for decoding further encoded signals.

Figure 8:
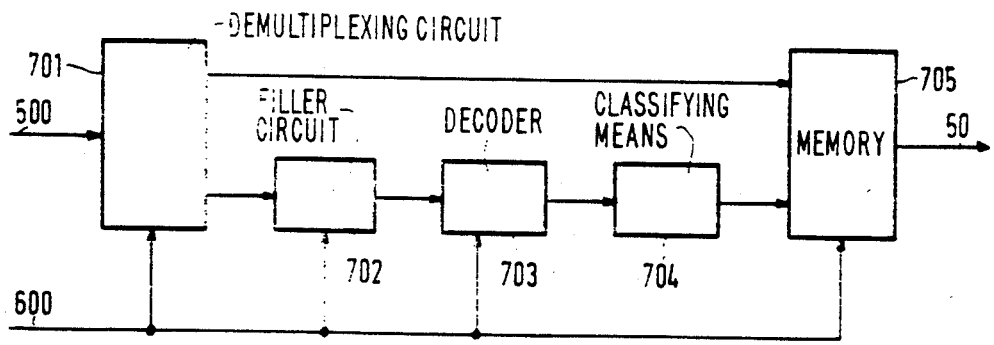

This stage 700, shown in FIG. 8, includes first of all demultiplexing means here formed by a demultiplexing circuit 700. Actually, it is known that, when the length L of information component blocks, before transmission, exceeds the capacity K of the selective protection stage 200, the remaining (L-K) bits, which are not coded by this stage, are multiplexed with the code words resulting from the encoding of the K first bits and supplied by said stage. The inverse demultiplexing operation must then be provided, in this situation, and is effected by the circuit 701. If however the length L does not exceed K, the circuit 701 cannot effect any demultiplexing operation and allows the totality of code words which were supplied by the stage 200 and, thereafter, passed through the sub-assembly 400 and the stage 500, to pass.

The demultiplexing circuit 701 is followed by inverse reducing means, here constituted by a filler circuit 702 intended to effect a processing operation which is the inverse of the reducing operation effected on transmission at the output of the Blokh-Zyablov encoder 202 (after having reset to zero the (K-L) non-utilized bits, when they occur in the information component sequences of length K processed by this encoder 202). The circuit 702 has for its function to fill up the number of missing bits in the code word received, after the encoding operation effected in the Blokh-Zyablov encoder 202. These missing bits were the result of the reducing procedure effected at the transmission end when the length L of an information component block is less than the capacity K of the selective protection stage. When the number of bits of a block is less than the maximum number of bits of the code word of the encoder 202 (for example 508 bits in the described example for this maximum number), the necessary number of zeros is added to have a complete code word available. In the opposite case, the circuit 702 is transparent, it does not affect any processing operation.

This circuit 702 is followed by selective coding means which, in the example described, is formed by a decoder with selective protection, for example a Blokh-Zyablov decoder 703. This decoder 703 realizes processing operations which are the inverse of the encoding operations effected at the transmission side by the selective encoding circuit. The decoder 703, shown in FIG. 9 and described in detail hereinafter, is followed by classifying means here constituted by a rearranging circuit 705 which performs the inverse of the operation effected by the bit classifying memory 201. These rearranging means are followed by storage means, for example a memory 705. The output signal of this memory 705 constitutes the output signal of the decoding stage 700, applied to the source decoder 50. The output signal of the memory 602 which, as mentioned in the foregoing, is the length of each block, is applied, in the decoding stage 700, to the demultiplexing circuit 701, to the filler circuit 702, to the decoder 703, and to the memory 705.

Figure 9:
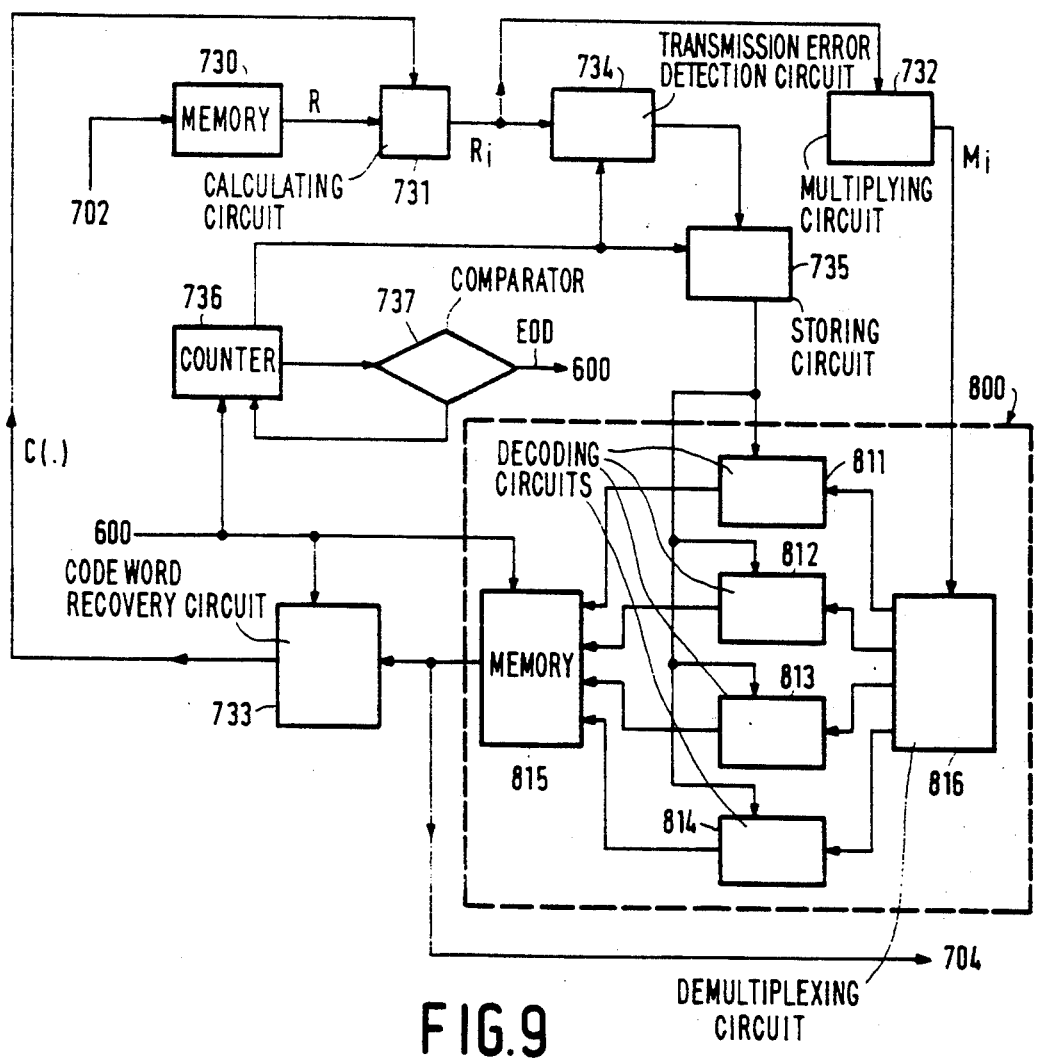
FIG. 9 shows an embodiment of selective decoding means provided in the decoding stage of FIG. 8.

In the embodiment shown in FIG. 9, the Blokh-Zyablov decoder 703 is based on the following operating principle. Let R be the code word received: as mentioned in the foregoing, this code word has the form of a matrix having 4 rows and 127 columns and is composed of the sum of two matrices 4, 127:

$$[R] = [C] + [E]$$

wherein C is the code word which is actually supplied by the Blokh-Zyablov encoder on transmission and E is the transmission error. The principle of decoding R consists in a successive estimation of the $k_1$, the number of bits for each of the selective encoding levels (wherein $i = 1$ to 4 in the case of 4 encoding levels): the result of the estimation of the $k_i$ bits of the protection level i renders it possible to estimate the subsequent $k_1 + 1$ bits of the level $i + 1$. Actually, the estimation of the $k_i$ bits is effected by determining the expression:

$$R_i = R - C(k_1, \ldots, k_{i-1}, 0, \ldots, 0)$$

in which $C)k_1, \ldots, k_{i-1}, 0, \ldots, 0)$ is the code word obtained when all the kv not yet encoded are assumed to be equal to zero.

The procedure of decoding kv bits is, in detail, as follows:

(a) $R_i = R - C(k_1, \ldots, k_{i-1}, 0, \ldots, 0)$ is calculated.

In the case in which $i = 1$ to 4, this means that there are sequentially calculated:

$$R_1 = R - C(0, 0, 0, \ldots, 0)$$

$$R_2 = R - C(k_1, 0, 0, \ldots, 0)$$

$$R_3 = R - C(k_1, k_2, \ldots, 0), \text{ etc.}$$

(b) any possible errors in the columns of Rv are detected. This detection is realized as follows. Let G be the matrix already mentioned: from its four lines, there are defined the sets $E_1, E_2, E_3, E_4$ of the words formed, respectively, by combining four lines 1000, 1100, 1010, 100 of this matrix G, by combining the three last lines of the matrix G, by combining the last three lines of the matrix G, by combining the two last lines of the matrix G, and from the last line of G. Consequently, these sets $E_1, E_2, E_3, E_4$ contain 16, 8, 4 and 2 elements, respectively. The detection of errors is effected by comparing the columns of the matrix $R_i$ to each element of the set $E_i$. If one of the columns is missing from this set, then there is an error in this column, and the address of this column associated with an error detection is stored (this address varies from 1 to 127 for a matrix R having 127 columns).

(c) the matrix $M_i = (G^t)^{-1} \cdot R_i$, in which expression $(G^t)^{-1}$ is the inverse matrix of the transpoed matrix $G^t$. This calculation renders it possible to refind the $i^{th}$ line of the matrix M which contains the encoded information components $k_i$ (not beset with errors).

(d) this $i^{th}$ line of $M_i$ is estimated on the one hand on the basis of the code words thus determined and on the other hand from the column addresses associated with the error detections, and the values $k_i$ thus determined are stored, to recover the new expression C by means of which it is possible to start a new calculation of $R_i$ (resumption of the operations (a) to (d) mentioned above), and so on until the procedure has thus ensured the decoding at all the selective protection levels, by successive estimations of all the $k_i$.

The procedure thus described is put into effect in the following circuits of the Blokh-Zyablov decoder 703 such as they are shown in FIG. 9 and here comprise four selective protection levels. To start with, the output signals of the filler circuit 702, which constitute the input signals of the decoder 703, are stored in a matrix memory 730, which thus contains the expression denoted R hereinafter. This matrix memory 730 is followed by a circuit 731 for calculating $R_i$, thereafter by a matrix multiplying circuit 732 to obtain the matrix expression $M_i$, which is then conveyed to the actual decoding device of the decoder 703.

Figure 5:
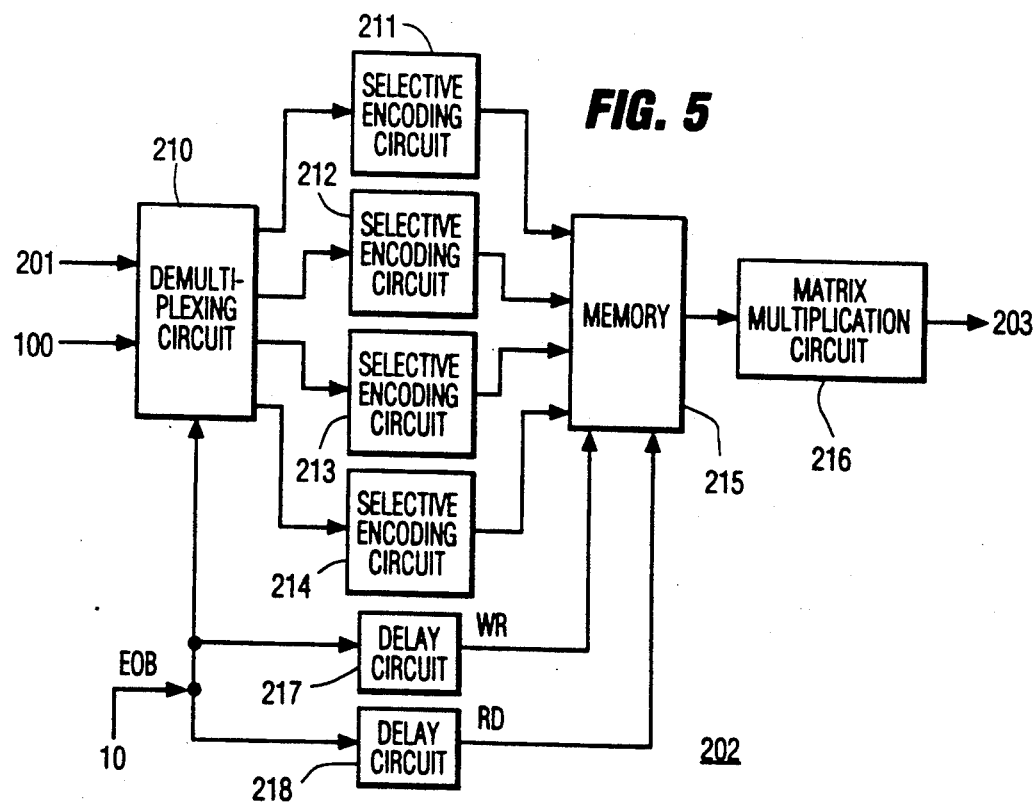
FIG. 5 shows an embodiment of the selective encoding circuit of the selective protection stage shown in FIG. 4.

This decoding device, denoted by reference numeral 800, comprises, in a manner comparable to the encoding device (210, 211, 212, 213, 214, 215) shown in FIG. 5, first of all a demultiplexing circuit 816, and thereafter, arranged in parallel, four selective decoding circuits 811 to 814 which each receive the bits assigned to them by the circuit 816. A matrix memory 815 for storing the decoded output signals of these circuits, is then provided at the outputs of the four decoding circuits 811 to 814. The output of this memory 815 is applied to a code word recovery circuit 733 intended to update the expression $C(k_1, \ldots, k_{i-1}, 0, \ldots, 0)$ abbreviated to $C(.)$ in FIG. 9, with a view to the new stage of the procedure for determining the subsequent $k_{i+1}$ bits. On the other hand, when all the k bits corresponding to each protection level of a block have been decoded, the output of the memory 815 is also conveyed, as the output signal of the Blokh-Zyablov decoder 703, to the classifying means, here the circuit 704 for rearrangement in the inverse order.

For this processing operation of th successive estimations of the k bits, it was mentioned in the foregoing that a stage for detecting transmission errors was indispensable. The said detection function is realised with the aid of a transmission error detection circuit 734 provided at the output of the circuit 731 for calculating $R_i$, arranged in parallel with the path connected to the decoding device 800 via the circuit 732. This circuit 734 includes, for realising the (n−1) cycles of error detection, means for comparing on the one hand the columns of the matrix expression $R_i$ and on the other hand, for the (n−1) selective protection levels other than the first, the sets $E_2, E_3, \ldots, E_n$ of the words formed, respectively, by combining the (n−1) last lines of the matrix G, by combining the (n−2) last lines of G, etc. . . . , by combining the two last lines of G, and formed, for the $n^{th}$ selective protection level, from the last line of G. When an error is detected in a column, its address (here from 1 to 127) is stored in a circuit 735 for storing said column addresses. It should here be noted that, in the set $E_1$ having 16 elements containing all the possible combinations of the four lines of the matrix G, all the columns $R_1$ are found again, and consequently that, for the first selective protection level, the detection effected by the circuit 734 does not exist. For this protection level, the error detection circuit 734 is transparent.

Finally, the decoder 703 of FIG. 9 includes a counter 736 for counting the selective protection levels and also a comparator 737 which ensures that counting of the number of levels is stopped and that an end-of-decoding signal EOD is transmitted.

We claim:

1. A system for encoding digital signals into output code words, said system comprising:
   a) a source encoder for variable length encoding the bits of said digital signals so as to form a plurality of blocks, each block having a respective number of bits which varies as a function of the information contained in each block; and
   b) a channel encoder coupled to said source encoder, comprising in series:
      i. first protection encoding means for further encoding each bit of each of said blocks as a function of the respective bit's sensitivity to transmission errors so as to form a plurality of first code words; and
      ii. second protection encoding means for encoding said plurality of said first code words so as to form said output code words.

2. An encoding system as claimed in claim 1, wherein said first protection encoding means comprises:
   (a) a block length encoding stage for determining and encoding lengths of each of said blocks so as to form respective block length code words;
   (b) a protection stage coupled to said block length encoding stage, for selectively protecting said blocks;
   (c) a multiplexing stage coupled to said block length encoding stage and said protection stage, for multiplexing the outputs supplied by said block length encoding stage and said protection stage.

3. An encoding system as claimed in claim 2, wherein the block length encoding stage comprises:
   (a) a bit counting circuit, for counting the number of bits forming each block so as to determine its respective bit length;
   (b) a first memory coupled to said bit counting circuit, for storing the the bit length of each block;
   (c) a block counting circuit coupled to said bit counting circuit, for counting blocks from end of a block signals supplied by said source encoder;
   (d) a decision circuit coupled to said block counting circuit and said first memory, for controlling reading of the first memory as a function of the output of said block counting circuit; and
   (e) an encoding circuit coupled to said decision circuit, for encoding the bit length of each of said blocks into said respective block length code words.

4. An encoding system as claimed in claim 3, wherein the protection stage comprises:
   (a) means for classifying the bits of each block in accordance with their sensitivity to transmission errors;
   (b) means coupled to said selective encoding means, for selective encoding said bits as a function of said classification so as to form classified code words; and
   (c) means for reducing the number of bits of said classified code words so as to form said second code words.

5. An encoding system as claimed in claim 4, wherein the means for classifying the bits in accordance with their sensitivity to transmission errors comprise a second memory arranged for receiving and storing said first code words from the source encoder, and a third memory for assigning an address for each of said first code words stored in said second memory and for supplying said first code words in a sequence which is modified as a function of said addressing;
the means for selective encoding comprise
a Blokh-Zyablov encoder; and
the reducing means comprise bit suppressing means.

6. An encoding system as claimed in claim 5, wherein the multiplexing stage comprises means for controlling the rate of its output signals.

7. An encoding system as claimed in claim 2, wherein the protection stage comprises means for classifying the bits of each block in accordance with their sensitivity to transmission errors.

8. An encoding system as claimed in claim 7, wherein the means for classifying the bits in accordance with their sensitivity to transmission errors comprise
a second memory arranged for receiving and storing said first code words, and a third memory for assigning an address for each of said first code words stored in said second memory and for supplying said first code words in a sequence which is modified as a function of said addressing;
the means for selective encoding comprise
a Blokh-Zyablov encoder; and
the reducing means comprise bit suppressing means.

9. An encoding system as claimed in claim 8, wherein the multiplexing stage comprises means for controlling the rate of output from said multiplexing means.

10. A system for decoding the output code words of claim 1, said system comprising:
 a) a channel decoder comprising in series:
  i. second protection decoding means for decoding said output code words into said first code words and
  ii. first protection decoding means for further decoding each of said first code words so as to form said blocks; and
 b) a source decoder coupled to said channel decoder so as to receive said blocks.

11. A decoding system as claimed in claim 10, wherein said first code words comprise a plurality of block length code words and second code words, and wherein said first protection decoding means comprises:
 (a) a length decoding stage, arranged for decoding said block length code words;
 (b) a second decoding stage;
 (c) a demultiplexing stage having an input coupled to said non-selective protection decoding means so as to receive said first code words, for switching the block length code words to said length decoding stage and said second code words to said second decoding stage.

12. A decoding system as claimed in claim 11, wherein the second decoding stage comprises:
 (A) means for demultiplexing said said second code words signals when the length of a block exceeds the encoding capacity;
 (B) selective decoding means comprising a Blokh-Zyablov decoder having n parallel-arranged selective decoding circuits;
 (C) inverse reducing means, for adapting the format of the signals to be decoded to the capacity of the said selective decoding means when the length of a block is less than said encoding capacity;
 (D) means for classifying the decoded digital signals in accordance with their sensitivity to transmission errors;
 (E) storage means for storing the signals thus classified.

* * * * *